Figure 1:
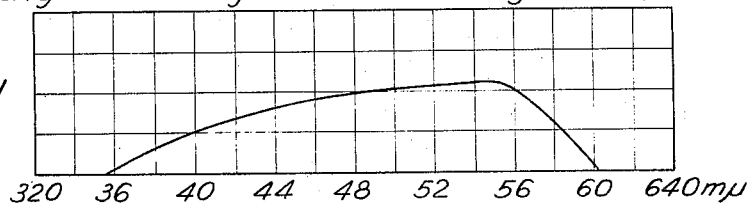

March 4, 1941.  L. G. S. BROOKER ET AL  2,233,509
PROCESS FOR PREPARING 8-METHYLOXATHIACARBOCYANINES
AND 8-METHYLOXASELENACARBOCYANINES
Filed Sept. 14, 1937

2,2'-Diethyl-8-Methyloxathiacarbocyanine Iodide 2,2'-Diethyl-8-Methyloxaselenacarbocyanine Iodide Leslie G. S. Brooker
Frank L. White
INVENTOR

BY
ATTORNEYS

Patented Mar. 4, 1941

2,233,509

UNITED STATES PATENT OFFICE 2,233,509

PROCESS FOR PREPARING 8-METHYLOXA-THIACARBOCYANINES AND 8 - METHYL-OXASELENACARBOCYANINES

Leslie G. S. Brooker and Frank L. White, Rochester, N. Y., assignors to Eastman Kodak Company, Rochester, N. Y., a corporation of New Jersey Application September 14, 1937, Serial No. 163,780

6 Claims. (Cl. 260—240)

This invention relates to new dyes and to photographic emulsions sensitized therewith. More particularly, this invention relates to new unsymmetrical carbocyanine dyes and to a new photographic emulsion sensitized to light of the green region of the spectrum.

This application is a continuation-in-part of our co-pending application Serial No. 30,736, filed July 10, 1935 (now United States Patent 2,112,140, dated March 22, 1938).

Our new dyes can be called unsymmetrical carbocyanine dyes and contain a benzoxazole and either a benzothiazole or a benzoselenazole nucleus. Unsymmetrical carbocyanine dyes containing both a benzoxazole and a benzothiazole nucleus are known in the art, but the dyes of our invention have properties distinct from the known dyes. From such known dyes, emulsions sensitized to the green can be prepared. We have found that while our new dyes sensitize to the green, our emulsions are possessed of properties distinct from those of the known emulsions, i. e. our emulsions possess green speeds much higher than those of the prior art. In view of the fact that our new dyes are somewhat related in structure to the structures of the known dyes, it is obvious that the higher green speeds in our new emulsions were clearly unpredictable. It has been known since the inception of the art that the sensitizing power of a dye cannot be forecast; in fact it has been known since the inception of the art that it is impossible to forecast that a dye will sensitize an emulsion at all. To date, the most that has been established is that sensitizing dyes have been found among certain groups of dyes, such as the azo group, the xanthene group and the cyanine group for example. Of these three groups, the cyanine group has yielded more useful sensitizing dyes than the azo or the xanthene group, so that it may be said that at present, it appears that the probabilities of finding a sensitizing dye in the cyanine group are greater than in the case of the xanthene or azo groups. But many cyanine dyes do not sensitize emulsions, some in fact desensitize, and the sensitizing power of a dye cannot be forecast, since its action is catalytic and the mechanism of the action not understood. Our instant finding is a further illustration of the fact that sensitizing power of a dye and improvement in sensitized emulsions cannot be forecast. There are many other even more impressive instances.

Accordingly, it is among the objects of our invention to provide new dyes of unique properties and a process for preparing the dyes. A still further object is to provide new emulsions strongly sensitized to the green. A still further object is to provide a process for the preparation of such emulsions. A still further object is to provide a photographic element comprising an emulsion strongly sensitized to the green. Other more specific objects and advantages will appear hereinafter.

Our new dyes can be represented by the following general formula:

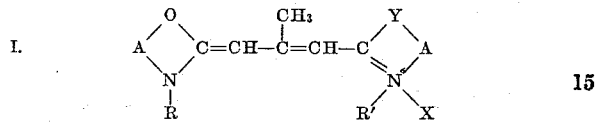

wherein A represents a phenylene group, such as —$C_6H_4$—, alkylphenylene, alkoxyphenylene, chlorophenylene or aminophenylene for example, R and R' represent alkyl groups of at least two carbon atoms, such a ethyl, isobutyl, isoamyl or allyl for example, Y represents sulfur or selenium and X represents an acid radical, such as halide, alkyltoluenesulfonate, perchlorate or alkyl sulfate for example. Those of our new dyes wherein R and R' represent alkl groups of from two to four carbon atoms are most advantageously employed in preparing our new emulsions. Our new dyes are advantageously employed in the form of their iodides (where X in the above formula represents iodide).

Our new dyes can be prepared by reacting a ketone compound of the type of the following formula:

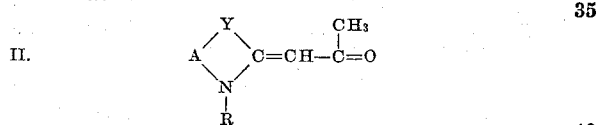

wherein A represents a phenylene group, Y represents sulfur or selenium and R represents an alkyl group of at least two carbon atoms with a 1-methylbenzoxazole quaternary salt. The reactions can be effected by merely heating the ketone compound and the benzoxazole quaternary salt together. However, it is advantageous to effect the reactions in the presence of a water-binding agent. We have found that anhydrides of lower fatty acids, particularly anhydrides of acetic, propionic and butyric acids are advantageously employed as water-binding agents. Diluents can be employed in the reaction mixture. Heat accelerates the formation of our new dyes.

While the process for preparing our new dyes is subject to variation, particularly as respects the nature and quantity of ketone compound employed, the nature and quantity of benzoxazole quaternary salt employed, the nature and quantity of water-binding agent employed if any, the nature and quantity of of diluent employed if any, the temperatures employed, time of reaction and method of isolation and purification of the dyes, the following examples will serve to illustrate the manner of obtaining our new dyes. These examples are not intended to limit our invention.

EXAMPLE 1.—*2,2'-diethyl-8-methyloxathiacarbocyanine iodide*

2.19 g. (1 mol.) of 1-acetylmethylene-2-ethylbenzothiazoline and 2.89 g. (1 mol.) of 1-methylbenzoxazole ethiodide were heated in about 25 cc. of acetic anhydride for about 20 minutes at the refluxing temperature. 250 cc. of diethyl ether were added to the reaction mixture and the whole was chilled at 0° C. The ether-acetic anhydride layer was decanted. The residue was boiled with about 75 cc. of acetone and the resulting mixture was chilled at 0° C. for about four hours. The crude dye was filtered off and washed with acetone. It was then twice recrystallized from methyl alcohol and obtained as reddish needles having a blue reflex and melting at 269° to 270° C. with decomposition. The dye has the following formula:

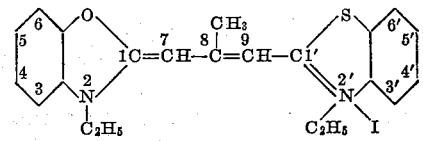

EXAMPLE 2.—*2,2'-diethyl-8-methyloxaselenacarbocyanine iodide*

5.32 g. (1 mol.) of 1-acetylmethylene-2-ethylbenzo selenazoline and 5.78 g. (1 mol.) of 1-methylbenzoxazole ethiodide were heated in about 15 cc. of acetic anhydride for about 10 minutes at the refluxing temperature. The cooled reaction mixture was diluted with 250 cc. of diethyl ether and the whole chilled at 0° C. The ether-acetic anhydride layer was decanted. The residue was boiled with about 50 cc. of acetone and the resulting mixture chilled at 0° C. for about four hours. The resulting crude dye was washed with hot acetone. It was then twice recrystallized from 95% ethyl alcohol and obtained as dull reddish crystals having a golden reflex and melting at 272° to 273° C. with decomposition. The dye has the following formula:

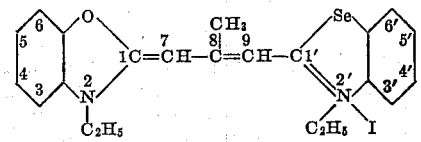

The alkiodide quaternary salts employed in the above examples are made in the usual well-known manner by heating the benzoxazole bases with the appropriate alkyliodide. Ordinarily, it is advantageous to employ about a 25% excess of alkyliodide and to heat it at about 100° C. for from five to seven days. The resulting alkiodide is advantageously crushed and washed with acetone. It can be used without further purification. We have found it advantageous to employ one molecular proportion of the benzoxazole quaternary salt to react with one molecular proportion of the ketone compound. However, an excess of either can be employed.

The ketone compounds employed in our process can be prepared by reacting a benzothiazole or benzoselenazole quaternary salt containing a reactive methyl group in the alpha position with an acyl halide in the presence of an acid-binding agent. Pyridine is advantageously employed as the acid-binding agent. The process for preparing the ketone compounds is fully described in our copending application Serial No. 29,916, filed July 5, 1935, as well as in British Patent 466,269. Instead of naming the ketone compounds as acylmethylene derivatives, they can also be named as ketone derivatives. For example, 1-acetylmethylene-2-ethylbenzothiazoline can also be called 1-acetonylidene-2-ethylbenzothiazoline.

Our new unsymmetrical dyes give rise to photographic emulsions possessing high green speeds in the region between or in the vicinity of the region between about 530 mu and 560 mu, when incorporated in the emulsions. Our invention is particularly directed to the customarily employed gelatino-silver-halide emulsions. However, our new unsymmetrical dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light sensitive. By way of illustration, the herein-described sensitized photographic emulsions were prepared employing an ordinary gelatino-silver-bromide emulsion.

In the preparation of photographic emulsions containing our new unsymmetrical dyes, it is only necessary to disperse the dyes in the emulsions. The methods of incorporating dyes in emulsions are simple and well known to those skilled in the art. In practicing our invention it is convenient to add the dyes from their solutions in appropriate solvents. The solvent must, of course, be compatible with the emulsion, substantially free from any deleterious effect on the light-sensitive materials and capable of dissolving the dyes. Methanol has proven satisfactory as a solvent for our new dyes. The dyes are advantageously incorporated in the finished, washed emulsion and should be uniformly distributed throughout to secure the best results.

The concentration of our new unsymmetrical dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a flowable gelatino-silver-halide emulsion with stirring. Stirring is continued until the dye is uniformly and practically homogeneously dispersed. Ordinarily 10 to 20 mg. of dye per 1000 cc. of flowable emulsion will suffice to produce the maximum sensitizing effect with the ordinary gelatino-silver-halide emulsions. The above statements are only illustrative and not to be understood as limiting our invention in any sense, as it will be apparent that our dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion, whereby the dye exerts a sensitizing effect upon the emulsions, as well as a photographic element comprising a support, ordinarily transparent, upon which the light-sensitive emulsion is coated or spread and allowed to dry.

Our new unsymmetrical dyes give rise to photographic emulsions possessing higher green speeds than the known emulsions containing known and structurally somewhat related unsymmetrical dyes. For example, emulsions sensitized to the green with either of the dyes given in the above two examples show a sensitivity, as measured through a minus blue filter (Wratten filter No. 12) at least 40% greater than the sensitivity of emulsions sensitized with the known unsymmetrical dye, 2,2',8-triethyloxathiacarbocyanine iodide.

The accompanying drawing is by way of illustration and depicts the sensitivity of emulsions containing two of our new dyes. Each figure in the drawing is a diagrammatic reproduction of a spectrogram showing the sensitivity of a silver bromide emulsion containing one of our new dyes.

In Fig. 1, the sensitivity of an ordinary gelatino-silver-bromide emulsion containing 2,2'-diethyl-8-methyloxathiacarbocyanine iodide is depicted.

Figure 2:
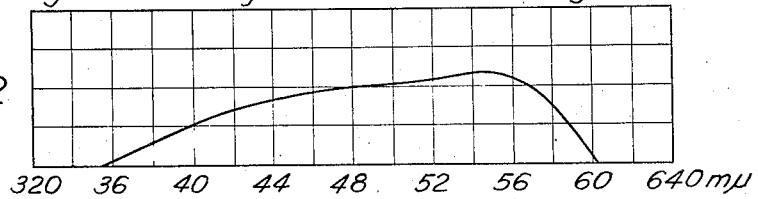

In Fig. 2, the sensitivity of an ordinary gelatino-silver-bromide emulsion containing 2,2'-diethyl-8-methyloxaselenacarbocyanine iodide is depicted.

Still further examples illustrating our invention could be cited, but the foregoing will be sufficient to teach those skilled in the art the manner in which our invention is carried out.

What we claim as our invention and desire to be secured by Letters Patent of the United States is:

1. A process for preparing a dye comprising reacting, in the presence of a water-binding agent, a 1-methylbenzoxazole quaternary salt in which the alkyl group of the quaternary salt contains at least two carbon atoms with a ketone compound of the following formula:

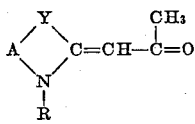

wherein A represents a phenylene group, R represents an alkyl group containing at least two carbon atoms and Y represents an atom selected from the group consisting of sulfur and selenium.

2. A process for preparing a dye comprising reacting, in the presence of acetic anhydride water-binding agent, a 1-methyl-benzoxazole alkiodide in which the alkyl group of the alkiodide contains at least two carbon atoms with a ketone compound of the following formula:

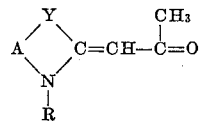

wherein A represents a phenylene group, R represents an alkyl group containing at least two carbon atoms and Y represents an atom selected from the group consisting of sulfur and selenium.

3. A process for preparing a dye comprising reacting, in the presence of acetic anhydride water-binding agent, a 1-methylbenzoxazole quaternary salt in which the alkyl group of the quaternary salt contains at least two carbons atoms, with a ketone compound of the following formula:

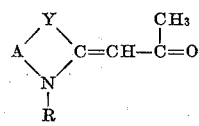

wherein A represents a phenylene group, R represents an alkyl group containing at least two carbon atoms and Y represents an atom selected from the group consisting of sulfur and selenium.

4. A process for preparing a dye comprising reacting, in the presence of a water-binding agent, a 1-methylbenzoxazole quaternary salt with a ketone compound of the following formula:

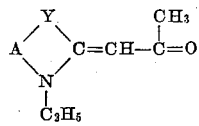

wherein A represents a phenylene group and Y represents and atom selected from the group consisting of sulfur and selenium.

5. A process for preparing a dye comprising reacting, in the presence of acetic anhydride water-binding agent, a 1-methylbenzoxazole quaternary salt with a ketone compound of the following formula:

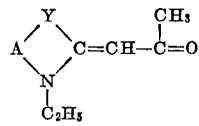

wherein A represents a phenylene group and Y represents an atom selected from the group consisting of sulfur and selenium.

6. A process for preparing a dye comprising reacting, in the presence of acetic anhydride water-binding agent, a 1-methylbenzoxazole ethiodide with a ketone compound of the following formula:

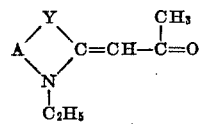

wherein A represents a phenylene group and Y represents an atom selected from the group consisting of sulfur and selenium.

LESLIE G. S. BROOKER.
FRANK L. WHITE.